UNITED STATES PATENT OFFICE.

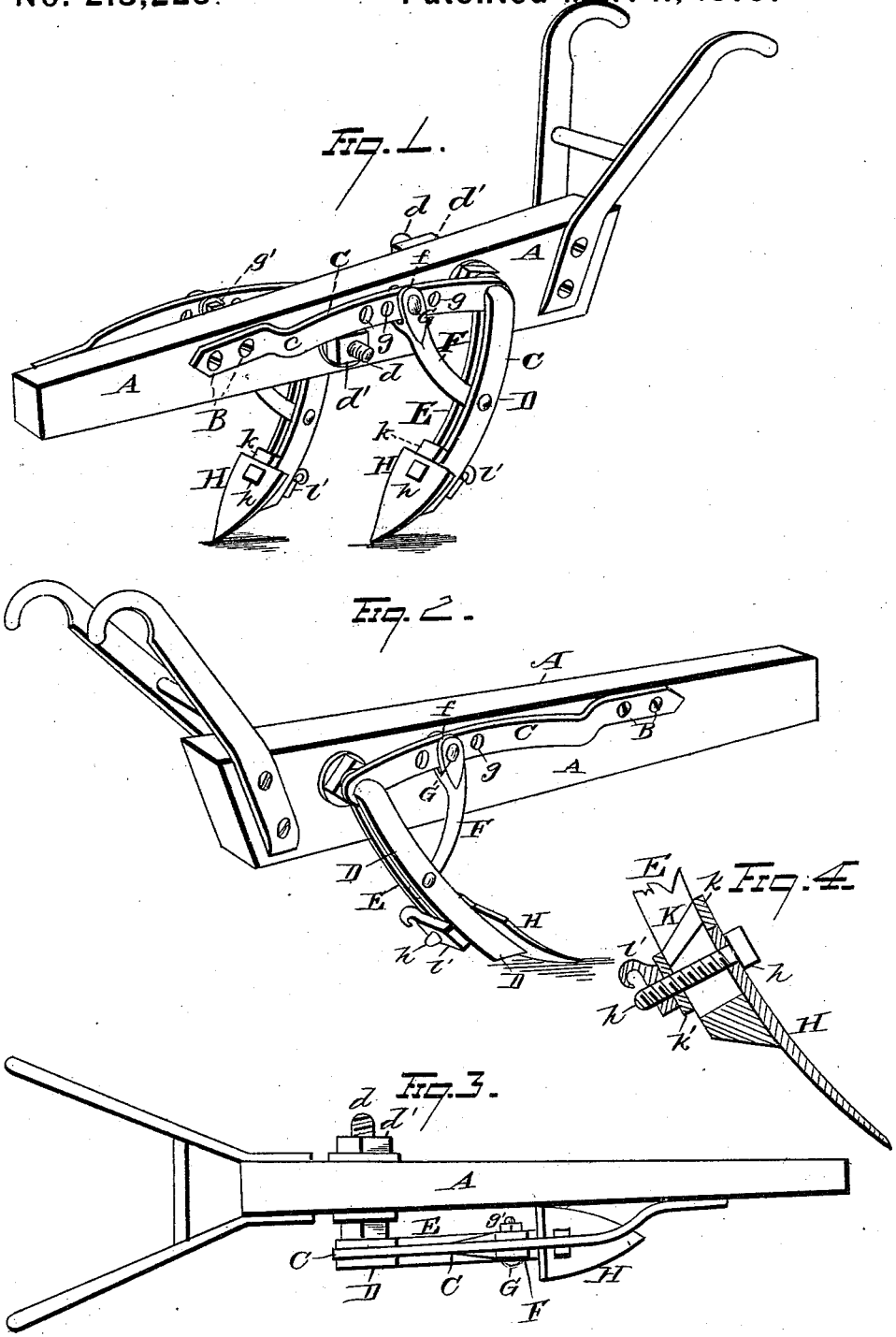

GEORGE W. McDANIEL, OF CONYERS, GEORGIA.

IMPROVEMENT IN PLOWS.

Specification forming part of Letters Patent No. 213,225, dated March 11, 1879; application filed December 5, 1878.

*To all whom it may concern:*

Be it known that I, GEORGE W. MCDANIEL, of Conyers, in the county of Rockdale and State of Georgia, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates more especially to shovel-plows, and is designed to provide improved mechanism whereby the shovels may be vertically adjusted upon the standard, and the latter be maintained at the desired distance from the ground, in inclination more or less at right angles to the horizontal.

The invention consists, first, in the combination, with a side beam, of the two bars composing the standard, the outer one thereof being formed with a stem, which passes through the plow-beam and the side beam, the same being adapted to secure the rear end of said side beam, together with the upper end of said standard, to the plow-beam; second, in the combination, with a plow-beam, of the two bars constituting the standard, one of said bars being formed with a horizontal stem, which passes through a corresponding slot in the plow-beam, and is of length adapted, by engagement of a nut on its screw-threaded extremity, to adjust said standard laterally to or from the plow-beam.

Referring to the drawings, Figure 1 is a view in side perspective, looking from the front, and illustrating the invention as applied to a double-shovel plow. Fig. 2 is a view in side perspective, looking from the rear, and illustrating the invention as applied to a single-shovel plow. Fig. 3 is a plan or top view of the same. Fig. 4 represents, in disconnected detail, one of the standards, together with connections.

The plow-beam A is provided with suitable holes for the passage of screws, bolts, or equivalent engaging devices, B, which secure the forward extremities of the side beams, C, thereto, while the rear extremities of said side beams are indirectly connected with the plow-beam by means of the right-angular stems $d$, formed, respectively, in single piece with the outer side bars, D, of the foot-beams.

Each standard is made in two longitudinal parts, having an open space between the same. The inner side bar, E, thereof is provided with a hole in its upper end, through which said stem $d$ passes, while between said outer and inner side bars the side beam is fitted, and held in place by the engagement of said stem with a corresponding hole formed in the rear extremity of said side beam.

The plow-beam is formed with two holes, $a$ $a'$, through which the stems of the two standards, respectively, pass. Nuts $d'$ engage with the threaded extremities of said stems, and serve to secure the latter to the plow-beam. Each standard is adapted to be adjusted in greater or less inclination to the ground, and thereby cause its connected shovel to be at the desired depth, by means of an adjusting-brace, F, the latter having its lower extremity fitted in the space between the two side bars of each standard and fastened to said bars. The upper extremity, $f$, of each brace is bifurcated, and embraces its appropriate side beam. A bolt or equivalent fastening device, G, secures the same at the desired point of the side beam by engagement with the graded series of holes $g$, formed in the latter. The side beams are bent outwardly for the main length of their body, as shown at $c$, in order to allow of the engagement of nuts $g'$ with their respective bolts, and thereby permit said bolts to be taken out of certain of their engaging-holes and put into others without unscrewing nuts $d'$ upon their appropriate stems.

The shovels H may be of any suitable construction, and are secured in vertical adjustment upon their respective standards by means of bolts $h$, which fit in the lower portion of the space formed between the two longitudinal parts of each of said standards. Stop devices K also fit in said spaces, and are formed each with a transverse head, $k$, on its upper extremity, and a slotted plate, $k'$, on its lower extremity. Both said head and plate are approximately at right angles to the length or main body of the stop device, which is inclosed between the outer and inner side bars.

The shovel-bolts pass, respectively, through said slotted plates, and are secured to the latter by nuts $l'$, the function of said bolt-and-nut engagement being also to secure the stop devices at the desired vertical adjustment upon the standards.

In this manner, by simply loosening the nuts $l'$, the stop devices, and also the shovels, are disengaged from close connection with the standards, and they can be moved to the proper point, so as to cause the shovels to be at the desired working depth.

This invention is adapted equally well to either single or double shovel plows, and, as shown in the drawings, such change can be readily made, the only removal of parts in order to convert the double into the single plow being to take off the left-hand standard, together with its connecting side beam, and then shift the right-hand standard and connecting side beam back in transverse line with the position in which said removed parts were previously located on the opposite side of the plow-beam.

The stems of the standards are made of greater length than the width of the plow-beam, whereby the standards may be secured to the beam both in lateral as well as vertical adjustment. This beam is adapted for use with any common plow as well as for shovel-plows.

Having fully described my invention, what I claim as new, and desire to secure by Letters Patent, is—

1. In a plow, the combination, with a side beam, of the two bars composing the standard, the outer one thereof being formed with a stem, which passes through the plow-beam and the side beam, the same being adapted to secure the rear end of said side beam, together with the upper end of said standard, to the plow-beam, substantially as set forth.

2. In a plow, the combination, with a plow-beam, of the two bars constituting the standard, one of said bars being formed with a horizontal stem, which passes through a corresponding hole in the plow-beam, and is of length adapted, by engagement of a nut on its screw-threaded extremity, to adjust said standard laterally to or from the plow-beam, substantially as set forth.

In testimony that I claim the foregoing I have hereunto set my hand this 25th day of November, 1878.

GEORGE W. McDANIEL.

Witnesses:
T. J. TREADWELL,
I. I. McGLUNE.